US011750605B2

(12) United States Patent
Alpert et al.

(10) Patent No.: US 11,750,605 B2
(45) Date of Patent: Sep. 5, 2023

(54) IDENTITY VALIDATION USING BLUETOOTH FINGERPRINTING AUTHENTICATION

(71) Applicant: TEXAS INSTRUMENTS INCORPORATED, Dallas, TX (US)

(72) Inventors: Yaron Alpert, Hod Hasharon (IL); Yaniv Weizman, Tel Aviv (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 242 days.

(21) Appl. No.: 16/998,774

(22) Filed: Aug. 20, 2020

(65) Prior Publication Data

US 2021/0058393 A1 Feb. 25, 2021

Related U.S. Application Data

(60) Provisional application No. 62/889,663, filed on Aug. 21, 2019.

(51) Int. Cl.
*H04L 29/06* (2006.01)
*H04L 9/40* (2022.01)
(Continued)

(52) U.S. Cl.
CPC .......... *H04L 63/0876* (2013.01); *G06F 16/22* (2019.01); *H04W 4/80* (2018.02); *H04W 12/06* (2013.01); *H04W 12/63* (2021.01)

(58) Field of Classification Search
CPC .... H04L 63/0876; H04W 4/80; H04W 12/63; H04W 12/06; G06F 16/22
See application file for complete search history.

(56) References Cited

U.S. PATENT DOCUMENTS

2007/0032225 A1* 2/2007 Konicek ............ G07C 9/00182
455/417
2011/0043328 A1* 2/2011 Bassali ................ G08C 17/02
340/5.71
(Continued)

FOREIGN PATENT DOCUMENTS

WO  WO-2017040929 A1 * 3/2017 ........... G05D 1/0088

OTHER PUBLICATIONS

W. E. Cobb, E. D. Laspe, R. O. Baldwin, M. A. Temple and Y. C. Kim, "Intrinsic Physical-Layer Authentication of Integrated Circuits," in IEEE Transactions on Information Forensics and Security, vol. 7, No. 1, pp. 14-24, Feb. 2012, doi: 10.1109/TIFS.2011. 2160170. (Year: 2012).*

*Primary Examiner* — Shawnchoy Rahman
(74) *Attorney, Agent, or Firm* — Mandy Barsilai Fernandez; Frank D. Cimino (57) ABSTRACT

A method includes storing a reference fingerprint for a first device in a database; operating a second device in an identity authentication mode; receiving, by the second device while operating in the identity authentication mode, a signal transmission from an unknown device; determining, by the second device, a fingerprint for the unknown device based on the signal transmission; responsive to the fingerprint of the unknown device matching the reference fingerprint for the first device, processing a data packet associated with the signal transmission; and responsive to the fingerprint of the unknown device not matching the reference fingerprint for the first device, ignoring the data packet associated with the signal transmission.

20 Claims, 2 Drawing Sheets

(51) Int. Cl.
*H04W 4/80* (2018.01)
*G06F 16/22* (2019.01)
*H04W 12/06* (2021.01)
*H04W 12/63* (2021.01)

(56) References Cited

U.S. PATENT DOCUMENTS

| | | | |
|---|---|---|---|
| 2015/0074796 A1* | 3/2015 | Meir | H04L 63/0861 |
| | | | 726/19 |
| 2016/0086402 A1* | 3/2016 | Black | G06F 21/6245 |
| | | | 340/5.53 |
| 2016/0232726 A1* | 8/2016 | Zizi | G06F 21/35 |
| 2017/0369071 A1* | 12/2017 | Gould | B60R 25/24 |
| 2021/0197763 A1* | 7/2021 | Nelson | B60R 25/25 |

* cited by examiner

IDENTITY VALIDATION USING BLUETOOTH FINGERPRINTING AUTHENTICATION

CROSS-REFERENCE TO RELATED APPLICATIONS

The present application claims priority to U.S. Provisional Patent Application No. 62/889,663, which was filed Aug. 21, 2019, is titled "Anti-Theft Protection And Identity Validation Using Bluetooth/Bluetooth Low Energy Fingerprinting Authentication," and is hereby incorporated herein by reference in its entirety.

SUMMARY

In accordance with at least one example of the disclosure, a method includes storing a reference fingerprint for a first device in a database; operating a second device in an identity authentication mode; receiving, by the second device while operating in the identity authentication mode, a signal transmission from an unknown device; determining, by the second device, a fingerprint for the unknown device based on the signal transmission; responsive to the fingerprint of the unknown device matching the reference fingerprint for the first device, processing a data packet associated with the signal transmission; and responsive to the fingerprint of the unknown device not matching the reference fingerprint for the first device, ignoring the data packet associated with the signal transmission.

In accordance with another example of the disclosure, a system includes a vehicle having a processor and a wireless transceiver. The wireless transceiver is configured to receive a signal transmission from an unknown device and provide data indicative of the signal transmission to the processor. The system also includes a vehicle key having a wireless transceiver. The system further includes a database coupled to the vehicle, in which the database is configured to store a reference fingerprint for the vehicle key. The processor of the vehicle is further configured to operate in an identity authentication mode; determine a fingerprint for the unknown device based on the data indicative of the signal transmission; responsive to the fingerprint of the unknown device matching the reference fingerprint for the vehicle key, process a data packet associated with the signal transmission; and responsive to the fingerprint of the unknown device not matching the reference fingerprint for the vehicle key, ignore the data packet associated with the signal transmission.

In accordance with yet another example of the disclosure, a system includes an authenticator device having a processor and a wireless transceiver. The wireless transceiver is configured to receive a signal transmission from an unknown device and provide data indicative of the signal transmission to the processor. The system also includes a key device having a wireless transceiver. The system further includes a database coupled to the authenticator device, in which the database is configured to store a reference fingerprint for the key device. The processor of the authenticator device is further configured to operate in an identity authentication mode; determine a fingerprint for the unknown device based on the data indicative of the signal transmission; responsive to the fingerprint of the unknown device matching the reference fingerprint for the key device, process a data packet associated with the signal transmission; and responsive to the fingerprint of the unknown device not matching the reference fingerprint for the key device, ignore the data packet associated with the signal transmission.

BRIEF DESCRIPTION OF THE DRAWINGS

For a detailed description of various examples, reference will now be made to the accompanying drawings in which.

DETAILED DESCRIPTION

Bluetooth (BT) and Bluetooth Low Energy (BLE) are communication protocol standards that facilitate wireless data transmission over a radio link. In some cases, a first device functions as a "key" (e.g., that is associated with a known or trusted user) and communicates with a second device using BT/BLE. The second device is an authenticator that, upon authenticating the first device based on a transmission signal received from the first device, filters incoming data (e.g., one or more data packets) and/or permits access to certain functionality of the second device (e.g., processing capabilities, modifying configuration settings). In one example, the first device is a vehicle key and the second device is a vehicle. When a user possessing the key is within a certain proximity to the vehicle, the user is permitted to lock or unlock the vehicle, start or stop a motor of the vehicle, or otherwise alter a configuration of the vehicle. In another, more general example, the first device is a user key (e.g., including an access permission profile) and the second device is an electronic device that the user associated with the user key is permitted to access, view restricted information contained thereon, and/or conduct a specific action on the second device that is otherwise restricted when a user does not possess an authenticated key device.

In some cases, BT/BLE communications are vulnerable to electronic eavesdropping, range extension, and identity theft by man-in-the-middle (MITM) attacks. In particular, MITM attacks are when a third device (e.g., a malicious device) impersonates the first and second devices, causing the first and second devices to connect to the third device, while believing that they are in contact or in range with each other instead. MITM attacks include, but are not necessarily limited to, packet relay attacks, extender relay attacks, angle manipulation attacks, multicarrier phase manipulation attacks, and symbol manipulation attacks, and the like.

Examples in this description address the foregoing by storing a radio fingerprint for the first (key) device in a database accessible by the second (authenticator) device. The radio fingerprint characterizes signal transmissions from the key device, for example at radio frequency (RF) and physical layer (PHY), or L1, levels based on amplitude, frequency, phase, signal energy, and other signal characteristics. In other examples, the radio fingerprint characterizes the signal transmissions from the key device at media access control (MAC)/internet protocol (IP), or L2, levels based on packets and flow characteristics, which are also dependent on unique hardware information (e.g., RF/PHY layer information) of the key device. In other examples, the radio fingerprint additionally characterizes signal transmissions from the key device based on transceiver channel estimation and PHY loop correction, including time domain, wavelet domain, spectral domain, and/or frequency domain statistical fingerprinting. In other examples, the radio fingerprint additionally characterizes signal transmissions from the key device based on higher-level (e.g., L2-level) fingerprinting, for example based on BT/BLE protocol behavior such as response signaling and timing. The radio fingerprint for the key device is referred to as a reference fingerprint when stored in the database because this fingerprint serves as a reference for future comparisons of fingerprints determined based on signal transmissions from a device (e.g., to determine whether there is a match with the reference fingerprint) . Subsequently, the authenticator device operates in an identity authentication mode and receives a signal transmission (e.g., a wireless BT/BLE communication) from an unknown device. The authenticator device determines a radio fingerprint associated with the unknown device based on the signal transmission. The authenticator device also determines whether the determined fingerprint matches the reference fingerprint stored in the database for the key device.

Responsive to the determined fingerprint matching (e.g., being within a predetermined threshold of) the reference fingerprint, the authenticator device processes a data packet (or a group of data packets) associated with the signal transmission (e.g., received from the key device). However, responsive to the determined fingerprint not matching (e.g., being outside the predetermined threshold from) the reference fingerprint, the authenticator device ignores the data packet (or group of data packets) associated with the signal transmission, because the key device has not been successfully authenticated. When the authenticator device ignores the data packet, the authenticator device stops processing the data packet beyond receiving the data packet.

In another example, processing the data packet is part of processing a data flow (e.g., a larger processing operation) being carried out by the authenticator device. In this example, responsive to the determined fingerprint matching the reference fingerprint for the key device, the authenticator device continues to process the data flow including the received data packet from the key device. However, responsive to the determined fingerprint not matching the reference fingerprint, the authenticator device not only ignores the data packet, but also stops processing the data flow that relied on the received data packet because the key device is no longer authenticated.

In yet another example, processing the data packet is part of a request to change a configuration of and/or to activate or deactivate a service provided by the authenticator device. In the example in which the authenticator device is a vehicle, the configuration settings include being in a locked versus an unlocked state, permitting push-button ignition of a motor, and the like. In this example, responsive to the determined fingerprint matching the reference fingerprint, the authenticator device grants a request, which includes at least the received data packet, to change its configuration settings (e.g., by transitioning from a locked state to an unlocked state). However, responsive to the determined fingerprint not matching the reference fingerprint, the authenticator device not only ignores the data packet, but also denies the request to change its configuration settings (e.g., remains locked to prevent theft of the vehicle) because the key device is no longer authenticated.

Figure 1:
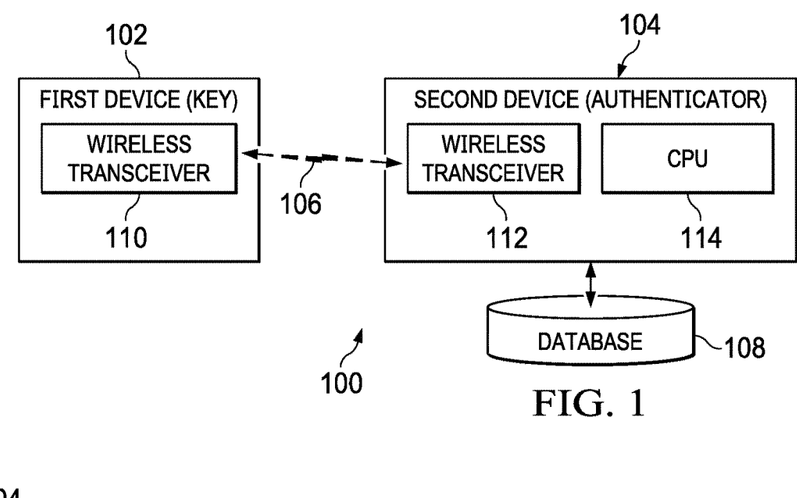
FIG. 1 is a block diagram of a system including an authenticator device, a key device, and a radio fingerprint database in accordance with various examples.

FIG. 1 is a block diagram of a system 100 in accordance with various examples of this description. The system 100 includes a first device (e.g., a key device) 102 and a second device (e.g., an authenticator device) 104. The first device 102 and the second device 104 are configured to communicate via a wireless communication link 106, for example using BT/BLE. The system 100 also includes a fingerprint database 108 that is coupled to the second device 104. In some examples, the database 108 is stored in a local memory of the second device 104 and thus is a local database. In other examples, the database 108 is stored in a memory that is remote from the second device 104, but that is accessible (e.g., by way of a wireless network) by the second device 104, and thus is a remote database.

The first device 102 includes a wireless transceiver 110 to facilitate communication over the wireless communication link 106. Although not shown for simplicity, the first device 102 also includes hardware (e.g., circuitry, hardware processor(s)) sufficient to facilitate the functionality described herein.

The second device 104 includes a wireless transceiver 112 to facilitate communication over the wireless communication link 106 and, in the case of a remote database 108, to facilitate access to the remote database 108. The second device 104 also includes a processor 114 that is configured to determine radio fingerprints for signal transmissions received by the second device 104. The signal transmissions are generated by the first device 102 (e.g., by the wireless transceiver 110) or an unknown (or yet-to-be determined) device and are received by the wireless transceiver 112 of the second device 104. The wireless transceiver 112 is configured to generate data indicative of the received signal transmission and the processor 114 is configured to receive the generated data from the wireless transceiver 112 and determine a fingerprint based on the received data from the wireless transceiver 112. The processor 114 is also configured to compare determined fingerprints to reference fingerprint(s) stored in the database 108 for the purposes of determining whether a determined fingerprint matches a reference fingerprint, and thus authenticating a data packet or other communication associated with the received signal transmission. Although not shown for simplicity, the second device 104 also includes hardware (e.g., circuitry, additional hardware processor(s)) sufficient to facilitate the other functionality described herein.

The database 108 is configured to store one or more reference fingerprints associated with one or more key devices, of which the first device 102 is an example. In an example, a reference fingerprint is a data structure that identifies unique characteristics of signal transmissions from a key device, for example based on amplitude, frequency, phase, signal energy, and other signal characteristics as described above that are dependent on unique hardware, or higher-level (e.g., L2-level) information of the key device. In some examples, the database 108 is pre-loaded with the reference fingerprint(s) based on an analysis of signal transmissions from key device(s).

In other examples, the second device 104 is configured to operate in a training mode (e.g., identity acquisition) to populate the database 108 with one or more reference fingerprints, each associated with a key device. For example, the second device 104 is configured to operate in the training mode when the second device 104 is positioned or located in a secured operation environment, which is a secure, controlled location (e.g., a production facility). Positioning the second device 104 in a secured operation environment ensures that fingerprints determined by the second device 104 in the training mode, which are subsequently stored in the database 108 as reference fingerprints, correspond to known, trusted key devices and not to malicious and/or unknown devices. The second device 104 is configured to receive a signal transmission (e.g., from the first device 102) while operating in the training mode. The second device 104 determines a fingerprint of the first device 102 based on the signal transmission. As a result of operating in the training mode, the determined fingerprint for the first device 102 is stored in the database 108 as a reference fingerprint. Thus, operating in the training mode enables the second device 104 to populate the database 108 with reference fingerprint (s) based on signal transmission(s) received from one or more key devices, such as the first device 102.

Irrespective of how the database 108 is populated, the second device 104 is also configured to operate in an identity authentication mode. While operating in the identity authentication mode, the second device 104 is configured to receive a signal transmission from an unknown device. The second device 104 is configured to determine a radio fingerprint for the unknown device based on the signal transmission. The second device 104 also determines whether the determined fingerprint matches the reference fingerprint stored in the database 108 (e.g., for the first device 102). In some examples, the second device 104 is configured to match a determined fingerprint with a reference fingerprint using a maximum likelihood methodology, an iterative correlation methodology, a Bayesian decision theory methodology, or other comparative methodologies to determine a distance between the determined fingerprint and the reference fingerprint. Responsive to the determined distance being less than a predetermined threshold (e.g., the determined fingerprint is close to the reference fingerprint), the second device 104 determines that a match exists. Responsive to the determined distance being greater than a predetermined threshold (e.g., the determined fingerprint is not close to the reference fingerprint), the second device 104 determines that a match does not exist.

Responsive to the determined fingerprint matching the reference fingerprint, the second device 104 processes a data packet associated with the signal transmission (e.g., received from the first device 102). However, responsive to the determined fingerprint not matching the reference fingerprint, the second device 104 ignores the data packet, because the unknown device has not been successfully authenticated as the first device 102 (e.g., is not a trusted key device). When the second device 104 ignores the data packet, the second device 104 stops processing the data packet beyond receiving the data packet. In some examples, the second device 104 thus authenticates received signal transmissions on a per-packet basis and without the need to engage in request/response type communications with the first device 102 or another device that is communicating with the second device 104. As a result, the examples described herein reduce the power consumed by both the first device 102 (or an unknown device) and the second device 104 by reducing the amount of inter-device communication for device authentication.

In another example, processing the data packet is part of processing a data flow (e.g., a larger processing operation) being carried out by the second device 104. In this example, responsive to the determined fingerprint matching the reference fingerprint, the second device 104 continues to process the data flow including the received data packet. However, responsive to the determined fingerprint not matching the reference fingerprint, the second device 104 not only ignores the data packet, but also stops processing the data flow that relied on the received data packet because the unknown device is no longer authenticated as the first device 102 (e.g., is not a trusted key device).

In yet another example, processing the data packet is part of a request to change a configuration of the second device 104. In the example in which the second device 104 is a vehicle, the configuration settings include being in a locked versus an unlocked state, permitting push-button ignition of a motor, and the like. In this example, responsive to the determined fingerprint matching the reference fingerprint, the second device 104 grants a request, which includes the received data packet, to change its configuration settings (e.g., by transitioning from a locked state to an unlocked state). However, responsive to the determined fingerprint not matching the reference fingerprint, the second device 104 not only ignores the data packet, but also denies the request to change its configuration settings (e.g., remains locked to prevent theft of the vehicle) because the unknown device is no longer authenticated as the first device 102 (e.g., is not a trusted vehicle key).

In some examples, the second device 104 is additionally configured to determine a proximity (e.g., a physical distance) to the unknown device that generates the signal transmission. In one example, the second device 104 is configured to determine the proximity based on a time of flight calculation, a phase difference calculation, a received signal strength indicator (RSSI) calculation, or the like. Responsive to the proximity determination being less than a proximity threshold (e.g., the device that generates the signal transmission is close enough to the second device 104), the second device 104 is configured to process the data packet—or continue processing a data flow associated with the data packet, or alter configuration settings based on a request associated with the data packet—associated with the received signal transmission. However, responsive to the proximity determination being greater than a proximity threshold (e.g., the device that generates the signal transmission is too far away from the second device 104), the second device 104 is configured to ignore the data packet associated with the received signal transmission.

In some examples, the second device 104 is configured to update a reference fingerprint in the database 108 while operating in the identity authentication mode. Irrespective of how the database 108 is initially populated with reference fingerprints, certain communication channel parameters (e.g., channel frequency, channel characteristic (e.g., channel state information (CSI)), receiver configuration), device operational parameters (e.g., a mode of operation, apply service to enable or disable accesses to specific device resources or data, a device activity or usage pattern), and/or device environmental parameters (e.g., temperature, operation duty cycle, receiver channel configuration) can affect or alter a subsequently-determined fingerprint even when the signal transmission originates from a known, trusted device such as the first device 102.

Figure 2:
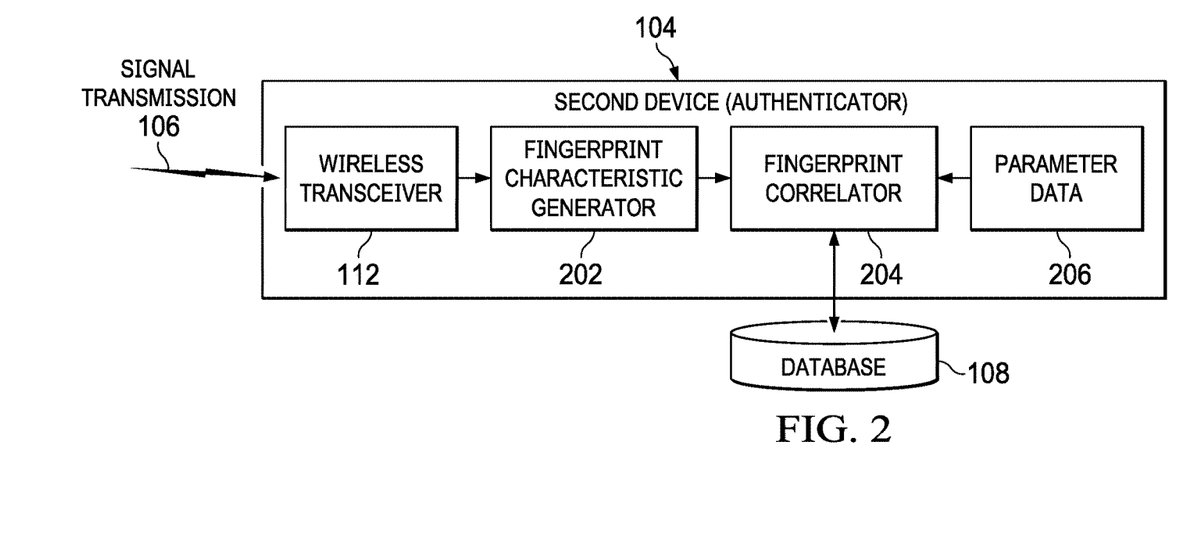
FIG. 2 is a block diagram of the authenticator device of FIG. 1 configured to update a reference fingerprint based on at least one of a communication channel parameter, an operational parameter, or an environmental parameter in accordance with various examples.

FIG. 2 is a block diagram of the second device 104 in greater detail. In FIG. 2, the second device 104 includes the wireless transceiver 112 as described above, and receives a signal transmission (e.g., via wireless communication link 106) as an input. The second device 104 includes a fingerprint characteristic generator 202, which generates a fingerprint data structure based on a received signal transmission (e.g., from a key device, such as the first device 102). The second device 104 also includes a fingerprint correlator 204, which compares a determined fingerprint based on a received signal transmission to reference fingerprint(s) stored in the database 108. An output of the fingerprint correlator 204 includes an indication of distance between (e.g., a degree of matching) the determined fingerprint and the reference fingerprint. The fingerprint characteristic generator 202 and the fingerprint correlator 204 represent functionality performed by one or more hardware components (e.g., by the processor 114 executing software) of the second device 104. The second device 104 also includes parameter data 206, which is data indicative of one or more communication channel parameters or operation and environmental parameters (e.g., generated by a sensor) of the second device 104.

In examples in which the second device 104 is configured to update a—reference fingerprint in the database 108 while operating in the identity authentication mode, the second device 104 is configured to receive a signal transmission from an unknown device and determine a fingerprint based on the signal transmission using the fingerprint characteristic generator 202. The fingerprint correlator 204 is configured to receive the determined fingerprint from the fingerprint characteristic generator 202 and is also configured to receive the parameter data 206.

As described above, communication channel parameters and environmental parameters can affect the fingerprint generated by the fingerprint characteristic generator 202, such that a fingerprint generated based on a signal transmission from a known, trusted device can deviate from the reference fingerprint for that device by more than a threshold amount (e.g., does not result in a match). However, the fingerprint correlator 204 is configured to determine an impact on the determined fingerprint that results from the parameter data 206, such as a change relative to the parameter data when the originally-stored reference fingerprint was generated. The fingerprint correlator 204 is also configured to re-calculate the distance between the determined fingerprint, accounting for the impact of the parameter data 206, and the reference fingerprint. Responsive to determined fingerprint, accounting for the impact of the parameter data 206, matching the reference fingerprint, the fingerprint correlator 204 is also configured to update the reference fingerprint based on the determined fingerprint and the parameter data 206. As a result, the reference fingerprint in the database 108 is occasionally tuned to specific communication channel and environmental parameters. In some examples, the tuning of the reference fingerprint improves reliability of the matching determination (e.g., by reducing false positives and/or false negatives).

Figure 3:
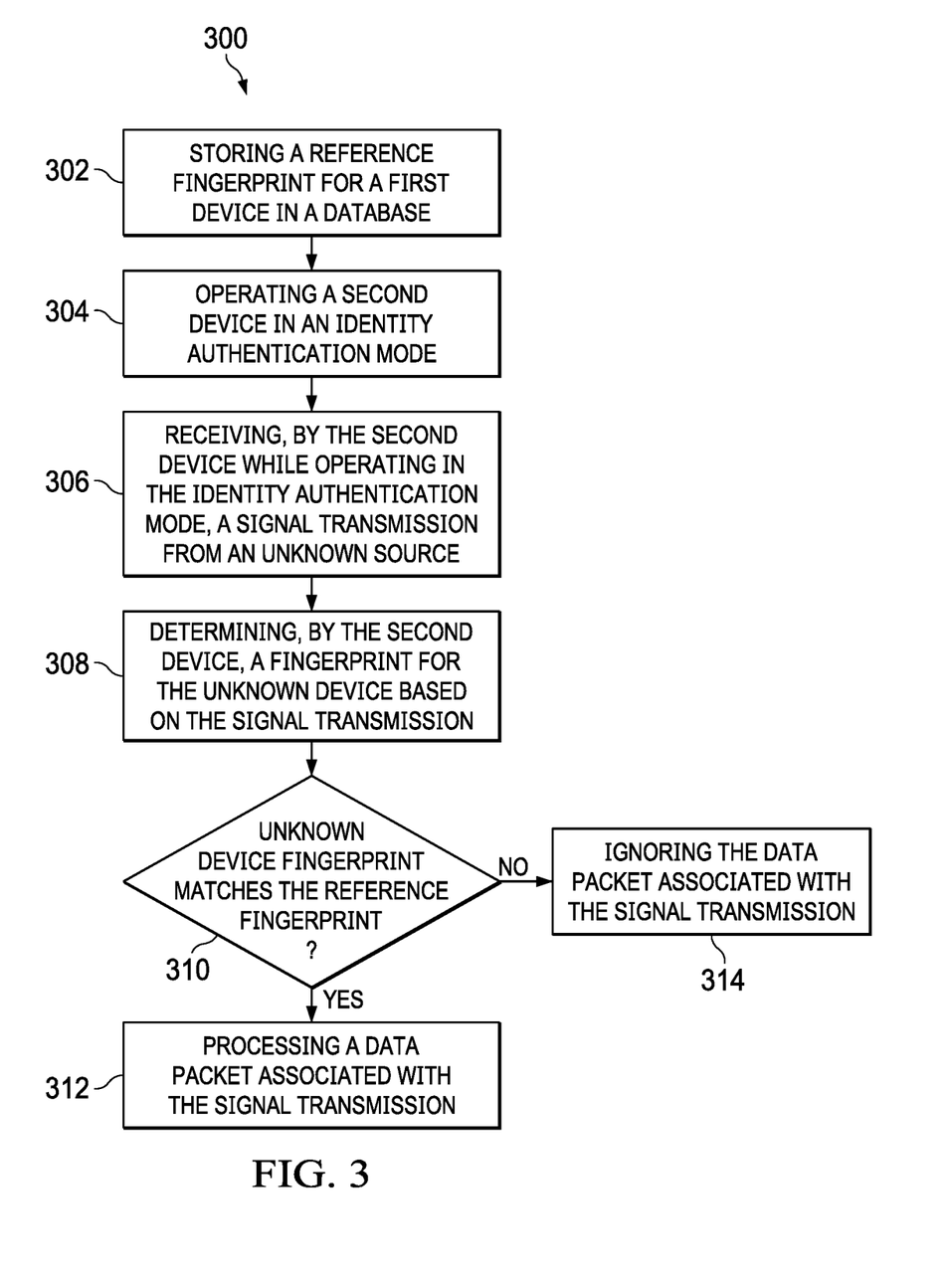
FIG. 3 is a flow chart of a method in accordance with various examples.

FIG. 3 is a flow chart of a method 300 in accordance with various examples of this description. The method 300 begins in block 302 with storing a reference fingerprint for a first device in a database, such as the database 108 described above. In some examples, the database 108 is stored in a local memory of the second device 104 and thus is a local database. In other examples, the database 108 is stored in a memory that is remote from the second device 104, but that is accessible (e.g., by way of a wireless network) by the second device 104, and thus is a remote database. As described above, a reference fingerprint is a data structure that identifies unique characteristics of signal transmissions from a key device, for example based on amplitude, frequency, phase, signal energy, and other signal characteristics as described above that are dependent on unique hardware, or higher-level (e.g., L2-level) information of the key device.

The method 300 then continues to block 304 with operating a second device (e.g., the second device 104 described above) in an identity authentication mode. The method 300 then continues to block 306 with receiving, by the second device while operating in the identity authentication mode, a signal transmission from an unknown device, for example over wireless communication link 106 using BT/BLE. The method 300 then continues to block 308 with determining, by the second device, a fingerprint for the unknown device based on the signal transmission.

The method 300 then continues to block 310, in which it is determined whether the fingerprint for the unknown device matches the reference fingerprint. In some examples, the second device 104 is configured to match a determined fingerprint with a reference fingerprint in the database 108 using a maximum likelihood methodology, an iterative correlation methodology, a Bayesian decision theory methodology, or other comparative methodologies to determine a distance between the determined fingerprint and the reference fingerprint. Responsive to the determined distance being less than a predetermined threshold (e.g., the determined fingerprint is close to the reference fingerprint), it is determined that a match exists. Responsive to the determined distance being greater than a predetermined threshold (e.g., the determined fingerprint is not close to the reference fingerprint), it is determined that a match does not exist.

Responsive to the fingerprint for the unknown device matching the reference fingerprint, the method 300 proceeds to block 312 with processing a data packet associated with the signal transmission (e.g., received from the first device 102). However, responsive to the fingerprint for the unknown device not matching the reference fingerprint, the method 30 proceeds to block 314 with ignoring the data packet associated with the signal transmission because the unknown device has not been successfully authenticated as the first device 102 (e.g., is not a trusted key device). In some examples, the method 300 thus includes authenticating received signal transmissions on a per packet basis and without the need to engage in request/response type communications with a device that is communicating with the second device 104 (e.g., the authenticator device). As a result, the methods described herein reduce the power consumed by both a key device (e.g., the first device 102) and an authenticator device (e.g., the second device 104) by reducing the amount of inter-device communication for device authentication.

In the foregoing discussion and in the claims, the terms "including" and "comprising" are used in an open-ended fashion, and thus mean "including, but not limited to . . . ." Also, the term "couple" or "couples" means either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is illustrative of the principles and various embodiments of the present disclosure. Numerous variations and modifications will become apparent to those skilled in the art once the above disclosure is fully appreciated. The following claims should be interpreted to embrace all such variations and modifications.

What is claimed is:

1. A method, comprising:
operating a first device in an identity authentication mode;
receiving, by the first device while operating in the identity authentication mode, a signal transmission;
determining, by the first device, a first fingerprint based on the signal transmission;
responsive to the first fingerprint matching a reference fingerprint for a first second device, processing a data packet associated with the signal transmission, and granting a request that includes the data packet to change a configuration of the first device; and
responsive to the first fingerprint not matching the reference fingerprint for the second device, ignoring the data packet associated with the signal transmission or denying the request to change the configuration of the first device.

2. A method, comprising:
operating a first device in an identity authentication mode;
receiving, by the first device while operating in the identity authentication mode, a signal transmission;
determining, by the first device, a first fingerprint based on the signal transmission;
responsive to the first fingerprint matching a reference fingerprint for a second device, processing a data packet associated with the signal transmission;
responsive to the first fingerprint not matching the reference fingerprint for the second device, ignoring the data packet associated with the signal transmission;
operating the first device in a training mode;
receiving, by the first device while operating in the training mode, a second signal transmission;
determining, by the first device, the reference fingerprint for the second device based on the second signal transmission; and
storing the reference fingerprint for the second device in a database.

3. The method of claim 2, further comprising positioning each of the first device and the second device in a secured operation environment prior to operating the first device in the training mode.

4. The method of claim 1, wherein the reference fingerprint for the second device is stored in a local memory of the first device.

5. The method of claim 1, wherein the reference fingerprint for the second device is stored in a memory remote from and accessible by the first device.

6. A method, comprising:
operating a first device in an identity authentication mode;
receiving, by the first device while operating in the identity authentication mode, a signal transmission;
determining, by the first device, a first fingerprint based on the signal transmission;
responsive to the first fingerprint matching a reference fingerprint for a second device, processing a data packet associated with the signal transmission;
responsive to the first fingerprint not matching the reference fingerprint for the second device, ignoring the data packet associated with the signal transmission;
receiving, by the first device, parameter data indicative of a communication channel parameter or an operation and environmental parameter of the first device; and
responsive to the first fingerprint matching the reference fingerprint for the second device, updating the reference fingerprint for the second device based on the first fingerprint and the parameter data.

7. The method of claim 1, further comprising:
responsive to the first fingerprint matching the reference fingerprint for the second device, continuing to process a data flow including the data packet; and
responsive to the first fingerprint not matching the reference fingerprint for the second device, stopping processing of the data flow.

8. The method of claim 1, further comprising:
denying the request to change the configuration of the first device.

9. The method of claim 1, wherein the signal transmission comprises a Bluetooth Low Energy signal transmission.

10. The method of claim 1, wherein the signal transmission is associated with an unknown device, the method further comprising:
determining, by the first device, a proximity to the unknown device; and
responsive to the determined proximity being greater than a proximity threshold, ignoring the data packet associated with the signal transmission.

11. A system, comprising:
a vehicle comprising a processor and a wireless transceiver, the wireless transceiver configured to receive a signal transmission and provide first data indicative of the signal transmission to the processor;
a vehicle key comprising a wireless transceiver; and
a database coupled to the vehicle, the database configured to store a reference fingerprint for the vehicle key;
wherein the processor of the vehicle is further configured to:
operate in an identity authentication mode;
determine a first fingerprint based on the first data;
responsive to the first fingerprint matching the reference fingerprint process a data packet associated with the signal transmission, and grant a request that includes the data packet to change a configuration of the vehicle; and
responsive to the first fingerprint not matching the reference fingerprint, ignore the data packet associated with the signal transmission or deny the request to change the configuration of the vehicle.

12. A system, comprising:
a vehicle comprising a processor and a wireless transceiver, the wireless transceiver configured to receive a signal transmission and provide first data indicative of the signal transmission to the processor;
a vehicle key comprising a wireless transceiver; and
a database coupled to the vehicle, the database configured to store a reference fingerprint for the vehicle key;
wherein the processor of the vehicle is further configured to:
operate in an identity authentication mode;
determine a first fingerprint based on the first data;
responsive to the first fingerprint matching the reference fingerprint process a data packet associated with the signal transmission;

responsive to the first fingerprint not matching the reference fingerprint, ignore the data packet associated with the signal transmission;
operate in a training mode;
receive, while operating in the training mode, second data indicative of a signal transmission from the vehicle key;
determine the reference fingerprint based on the second data; and
store the reference fingerprint in the database.

13. A system, comprising:
a vehicle comprising a processor and a wireless transceiver, the wireless transceiver configured to receive a signal transmission and provide first data indicative of the signal transmission to the processor;
a vehicle key comprising a wireless transceiver; and
a database coupled to the vehicle, the database configured to store a reference fingerprint for the vehicle key;
wherein the processor of the vehicle is further configured to:
operate in an identity authentication mode;
determine a first fingerprint based on the first data;
responsive to the first fingerprint matching the reference fingerprint process a data packet associated with the signal transmission;
responsive to the first fingerprint not matching the reference fingerprint, ignore the data packet associated with the signal transmission;
receive parameter data indicative of a communication channel parameter, an operation parameter, or an environmental parameter of the vehicle; and
responsive to the f fingerprint matching the reference fingerprint, update the reference fingerprint based on the first fingerprint and the parameter data.

14. The system of claim 11, wherein the processor of the vehicle is further configured to:
deny the request to change the configuration of the vehicle.

15. The system of claim 11, wherein the processor of the vehicle is further configured to:
determine a proximity to device generating the signal transmission; and
responsive to the determined proximity being greater than a proximity threshold, ignore the data packet associated with the signal transmission.

16. A system, comprising:
an authenticator device comprising a processor and a wireless transceiver, the wireless transceiver configured to receive a signal transmission and provide first data indicative of the signal transmission to the processor;
a key device comprising a wireless transceiver; and
a database coupled to the authenticator device, the database configured to store a reference fingerprint for the key device;
wherein the processor of the authenticator device is further configured to:
operate in an identity authentication mode;
determine a fingerprint for an unknown device based on the data indicative of the signal transmission;
responsive to the fingerprint of the unknown device matching the reference fingerprint for the key device, identify the unknown device and the key device, and process a data packet associated with the signal transmission;
responsive to the fingerprint of the unknown device not matching the reference fingerprint for the key device, ignore the data packet associated with the signal transmission;
operate in a training mode;
receive, while operating in the training mode, second data indicative of a second signal transmission;
determine the reference fingerprint for the key device based on the second data indicative of the signal transmission; and
store the reference fingerprint in the database while the processor of the authenticator device operates in the training mode.

17. A system, comprising:
an authenticator device comprising a processor and a wireless transceiver, the wireless transceiver configured to receive a signal transmission and provide first data indicative of the signal transmission to the processor;
a key device comprising a wireless transceiver; and
a database coupled to the authenticator device, the database configured to store a reference fingerprint for the key device;
wherein the processor of the authenticator device is further configured to:
operate in an identity authentication mode;
determine a fingerprint for an unknown device based on the data indicative of the signal transmission:
responsive to the fingerprint of the unknown device matching the reference fingerprint for the key device, identify the unknown device and the key device, and process a data packet associated with the signal transmission;
responsive to the fingerprint of the unknown device not matching the reference fingerprint for the key device, ignore the data packet associated with the signal transmission;
receive parameter data indicative of a communication channel parameter, an operation parameter, or an environmental parameter of the authenticator device; and
responsive to the fingerprint of the unknown device matching the reference fingerprint for the key device, update the reference fingerprint for the key device based on the determined fingerprint and the parameter data.

18. The system of claim 16, wherein the processor of the authenticator device is further configured to:
responsive to the fingerprint of the unknown device matching the reference fingerprint for the key device, continue to process a data flow including the data packet; and
responsive to the fingerprint of the unknown device not matching the reference fingerprint for the key device, stop processing of the data flow that relied on the data packet.

19. The system of claim 16, wherein the processor of the authenticator device is further configured to:
determine a proximity to the unknown device; and
responsive to the determined proximity being greater than a proximity threshold, ignore the data packet associated with the signal transmission.

20. The method of claim 1, wherein determining the first fingerprint based on the signal transmission comprises determining the first fingerprint based on amplitude, frequency, phase, or signal energy associated with the signal transmission.

\* \* \* \* \*